Aug. 25, 1936.　　　　V. AIGNER　　　　2,052,377
SUPERVISION OF ELECTRIC SYSTEMS
Filed May 29, 1935　　　2 Sheets-Sheet 1
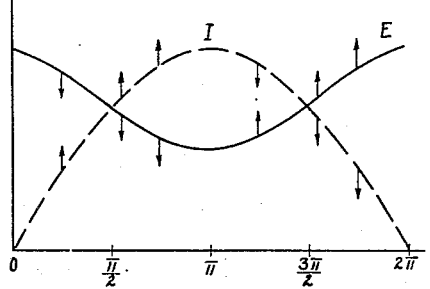
Relation between Voltage Vectors at ends of line
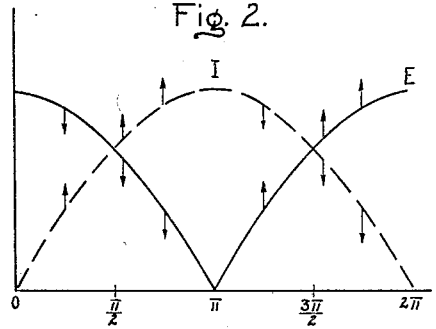
Relation between Voltage Vectors at ends of line
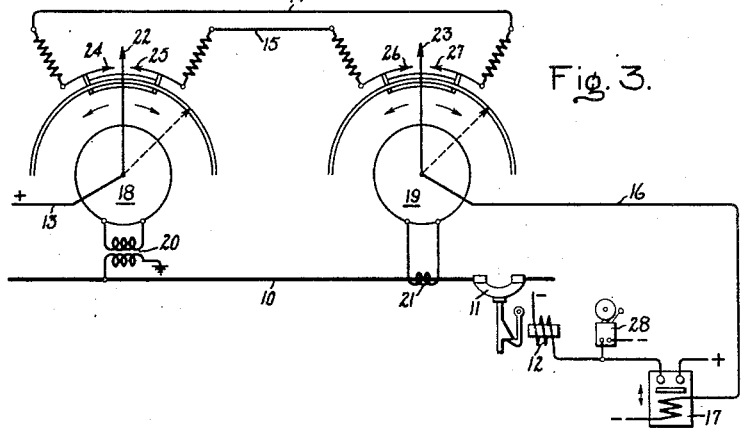
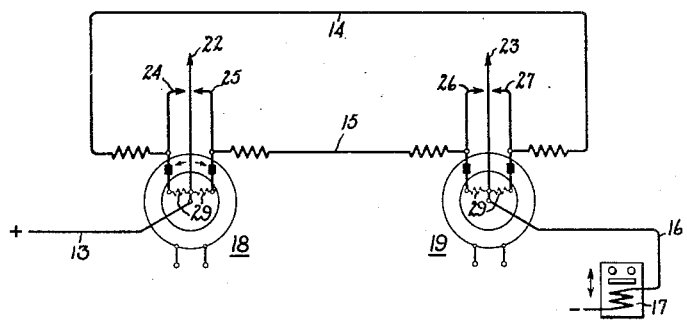
Inventor:
Viktor Aigner.
by Harry E. Dunham
His Attorney.

Aug. 25, 1936.   V. AIGNER   2,052,377
SUPERVISION OF ELECTRIC SYSTEMS
Filed May 29, 1935   2 Sheets-Sheet 2
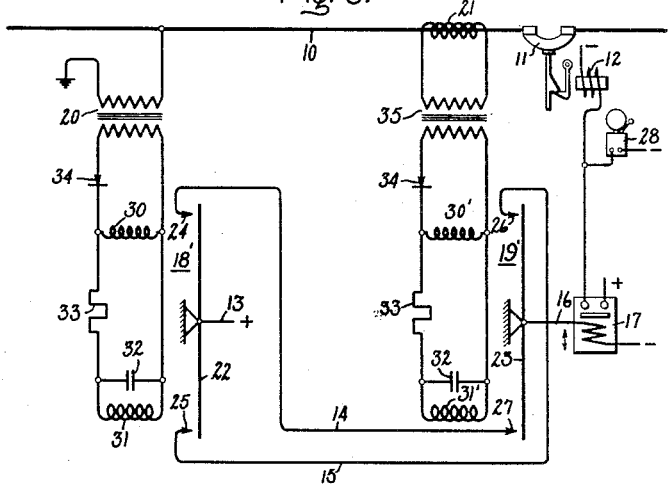
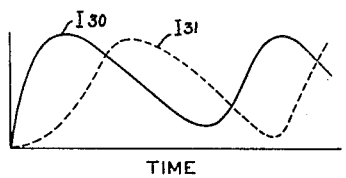
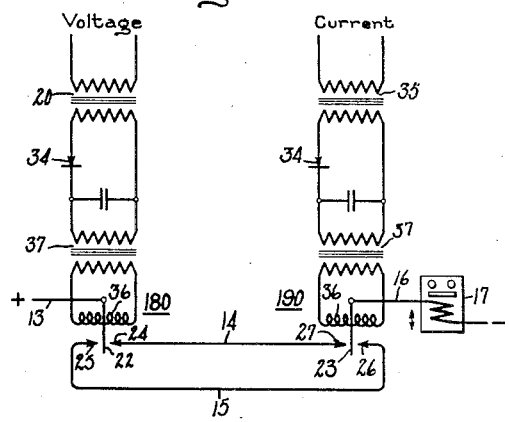
Inventor:
Viktor Aigner,
by Harry E. Dunham
His Attorney.

Patented Aug. 25, 1936

2,052,377

UNITED STATES PATENT OFFICE 2,052,377

SUPERVISION OF ELECTRIC SYSTEMS

Viktor Aigner, Berlin-Charlottenburg, Germany, assignor to General Electric Company, a corporation of New York Application May 29, 1935, Serial No. 24,158
In Germany June 29, 1934

16 Claims. (Cl. 175—294)

My invention relates to improvements in the supervision of electric systems and an object of my invention is to provide an improved means for detecting a sustained asynchronous condition of the system. Another object of my invention is to provide an improved means for subdividing the system on the occurrence of a sustained asynchronous condition whereby to reduce the hazard of false operation of the system's fault responsive protective apparatus.

It is known that the selective protection of an electric system is disturbed on the occurrence of oscillation phenomena. These arise when the synchronism of the system power plants is so disturbed that the voltages of the individual generators feeding the system have a sustained displacement relatively to each other. In consequence, there are supplied to the fault responsive relays of the various protective devices, currents and voltages which are caused principally by the out-of-step conditions and not by the location of the fault or the mutual relation between network voltage and fault current. Because of this it may be necessary to render the protective devices ineffective on the occurrence of oscillation phenomena and to open the network in order to avoid further disturbance in operation. For opening or subdividing the network there may be chosen points at which no power is being transmitted so that theoretically no change whatever occurs in the supply of the respective generators. Also as the changes occur practically in the supply to the individual consumers, there is no noticeable influence on the stability of the operation.

My invention will be better understood from the following description when considered in connection with the accompanying two sheets of drawings and its scope will be pointed out in the appended claims.

In the accompanying two sheets of drawings, Figs. 1 and 2 are curve diagrams explanatory of my invention; Figs. 3 and 4 illustrate diagrammatically one embodiment of my invention; Fig. 5 illustrates diagrammatically another embodiment of my invention; Fig. 6 is a curve diagram explanatory of the embodiment of my invention shown in Fig. 5; and Fig. 7 illustrates diagrammatically another embodiment of my invention.

In accordance with the object of my invention, which is to provide improved apparatus for operation on the occurrence of oscillation phenomena, I provide means whose operation is based on the fact that the effective values of current and voltage change in an opposite sense over a period which in case of oscillations is longer than the time required for the short circuit current to reach its maximum value in case of a fault.

In this connection reference will now be had to Figs. 1 and 2 which illustrate the variation in phase voltage E and supply current I over one oscillation, as a function of the phase relation of the voltages at the ends of a line section or the mutual angular position of their vectors. Fig. 1 shows the variation of E and I at points corresponding to ¼ and ¾ of the length of the section and Fig. 2 shows the variation of E and I at the midpoint of the section.

My invention is based on the fact that at every point of the line the current and voltage change oppositely during oscillations. Thus, if in Figs. 1 and 2, the tendency to change of the plotted quantities E and I is followed and corresponding arrows applied as shown, then it is seen that the arrows on the current and voltage curves are always oppositely directed. In other words, the two curves show opposite rates of change. A like tendency occurs in case of faults only up to the moment the short circuit current has attained its maximum value. Up to this moment only, is an increase in current co-existent with a decrease in voltage. Otherwise, during a fault, as well as other operating conditions, the current decreases with the voltage, or both quantities change in the same sense. For this reason, the operation of apparatus embodying my invention is made dependent on the fact that the time of variation of current and voltage in the opposite sense is greater than the time required for the short circuit current to reach its maximum value. This time is very short. Hence a delay of a half or a whole cycle would be sufficient. However, to be on the safe side the delay can be set at a quarter of a second or more, if desirable.

The embodiment of my invention, illustrated in Fig. 3 merely by way of example, is shown as applied to an alternating current electric system schematically indicated by a circuit conductor 10 which is provided with suitable interrupting means such as a latched closed circuit breaker 11 having a trip coil 12. An operating current circuit, shown as including conductors 13, 14, 15, and 16 and a device 17 to be operated, is controlled by the contacts of a voltage dependent relay 18 and a current dependent relay 19. These relays are of the so-called surge-responsive or rate-of-change type, examples of which are well known to the art and for one of which reference may be had to United States Letters Patent 1,687,624, issued October 16, 1928. For this reason and in order to avoid complication of the diagram, the relays 18 and 19 are only schematically illustrated by indicating that they are connected to the system, of which the circuit conductor 10 is a part, to be energized by a system voltage and a system current, respectively, through a potential transformer 20 and a current transformer 21.

The relays 18 and 19 have movable contacts 22 and 23, respectively, which are freely movable between pairs of jointly movable contacts 24, 25 and 26, 27, respectively. The contacts 24, 25, 26 and 27 are so interconnected that the operating current circuit can be completed only when the contacts 22 and 23 move in opposite directions, as shown in the drawing. Thus, if the voltage increases the contact 22 moves to the right and engages the contact 25. The contact pair 24 and 25, being movably mounted, will be moved according to the magnitude of the movement of the contact 22. If a decrease in current is simultaneous with the increase in voltage, the contact 23 moves to the left and engages the contact 26. The contact pair 26, 27 will be displaced counterclockwise. If the oscillation increases, there will come a moment when the voltage passes through zero and the current becomes a maximum. The contacts 22 and 23 now reverse their movement and engage the contacts 24 and 27 and thus maintain the flow of the current in the operating current circuit. Now if the device 17 is a cumulative action device, for example, a time delay relay with time action in both directions as indicated by the doubleheaded arrow, then the short interruption while the contacts 22 and 23 are changing their positions will have no effect on the operation to be performed. This operation may be to have an indicator, such as a bell 28, actuated, or the circuit breaker tripped, or both, by the contacts of the device 17, as shown. When the oscillation ceases, suitable means, for example springs 29, as shown in Fig. 4, center the contact 22 between its co-operating contacts 24 and 25 and the contact 23 between its contacts 26 and 27. Thus, if only a drop in voltage occurs without an increase in current, then after making a brief engagement with the contact 24, the contact 22 will again assume its center position under the action of the centering springs 29. It is, of course, quite immaterial what absolute value the voltage may have at the moment. In case of a short-circuit, this will have occurred before the cumulative action relay 17 has permitted an operation so that false operation during faults is avoided.

For the rate of change responsive devices a construction such as is usual for soft-iron electroresponsive devices with high natural frequency is particularly suitable. Also direct-current electroresponsive devices supplied by rectifiers and having high torque and high natural frequencies may be used.

In the embodiment of my invention shown in Fig. 5, the rate of change voltage and current responsive means are illustrated as differential relays 18', 19'. The movable contacts 22 and 23 operate according to their direction of movement to engage contacts 24 or 25 and contacts 26 or 27, respectively. These contacts are so interconnected that the operating circuit is completed only on opposite movements of the contacts 22 and 23. The operating windings 30, 31 of the relay 18' are so connected that the current in the winding 31 increases and decreases more slowly than the current in the winding 30. For this purpose, a condenser 32 may be connected in parallel with the winding 31 and the resistance 33 in series. Both windings are connected to the potential transformer 20 through a rectifier 34. If the voltage on the transformer 20 increases, then the current in the winding 30 increases more rapidly than the current in the winding 31 since the condenser 32 must be charged before any appreciable current flow occurs in the winding 31. In Fig. 6 the currents in the windings 30 and 31 are represented by the curves $I_{30}$ and $I_{31}$, respectively. For a drop in voltage, the conditions are reversed. The operating windings 30', 31' of the relay 19' are similarly connected and arranged except that they are connected in series relation with the line current transformer 21 by an intermediate current transformer 35 of such a type as to prevent excessive voltages by reason of the one way current flow. Otherwise, than the above-explained differences between this embodiment of my invention and the embodiment shown in Fig. 1, the embodiment shown in Fig. 5 operates in substantially the same manner to complete the operating circuit and thereby energize the cumulative-action device 17, which, as before explained, may either trip the breaker directly or give an out-of-step indication through a suitable device such as the bell 28.

In the embodiment of my invention shown in Fig. 7, the voltage and current responsive means 180 and 190, respectively, are schematically illustrated as directionally dependent devices, for example, polarized relays, examples of which are well known to the art. The operating windings 36 of the relays 180 and 190 are respectively connected to be energized responsively only to changes in line voltage and current, and not the absolute magnitudes thereof, by using rectifiers 34. The outputs of these rectifiers are fed to non-saturating transformer means 37, the secondaries of which accordingly supply current at slip frequency to the respective relays. If a full wave rectifier is not used with the current responsive relay 190, then an intermediate saturating transformer 35 may be connected between the line current transformer, not shown, and the rectifier 34 in order to avoid excessive voltages on the alternate half wave not rectified. The directions of the movement of the contacts 22 and 23 of the relays 180 and 190 respectively depend on whether the voltage and the current are increasing or decreasing. Consequently, it is only when the rates of change are opposite that the contacts 22 and 23 are so positioned as to complete the operating circuit 13, 14, or 15, and 16, whereby to energize the cumulative action devices 17, the functions of which have heretofore been explained.

What I claim as new and desire to secure by Letters Patent of the United States is:

1. In combination, an electric system and means responsive to a predetermined relation between the rates of change of a current and a voltage of the system for determining a sustained asynchronous condition of the system including rate of change relay means connected to be energized in accordance with a current and a voltage of the system.

2. In combination, an electric system and means responsive to a predetermined relation between the rates of change of a current and a voltage of the system for determining a sustained asynchronous condition of the system including a rate of change relay means connected to be energized in accordance with a current and a voltage of the system, and means controlled by said rate of change relay means for subdividing said system when the voltage at one point of the system becomes asynchronous relatively to the corresponding voltage at another point of the system.

3. In combination, an electric system and means for determining a sustained asynchronous condition of the system including means connected to be energized in accordance with a current and a voltage of the system operative in dependence on the duration of the opposite rates of change of said current and voltage during asynchronous conditions.

4. In combination, an electric system and means for determining a sustained asynchronous condition of the system including rate of change responsive relay means connected to be energized in accordance with a current and a voltage of the system operative in dependence on the duration of the opposite rates of change of said current and voltage during asynchronous conditions.

5. In combination, an electric system and means for determining a sustained asynchronous condition of the system including means connected to be energized in accordance with a current and a voltage of the system operative in dependence on the duration of the opposite rates of change of said current and voltage during asynchronous conditions and a time action responsive device connected to be controlled by said current and voltage energized means.

6. In combination, an electric system and means operative in dependence on the duration of the opposite rates of change of a current and a voltage of said system during asynchronous conditions of the system for determining a sustained asynchronous condition of the system including a rate of change relay means connected to be energized in accordance with a current of the system and a rate of change relay means connected to be energized in accordance with a voltage of the system.

7. In combination, an electric system and means operative in dependence on the duration of the opposite rates of change of a current and a voltage of said system during asynchronous conditions of the system for determining a sustained asynchronous condition of the system including a rate of change relay means connected to be energized in accordance with a current of the system and a rate of change relay means connected to be energized in accordance with a voltage of the system, and time action means controlled by said rate of change relay means.

8. In combination, an electric system, means for subdividing said system on the occurrence of a sustained asynchronous condition between a voltage at one point of the system and the corresponding voltage at another point of the system including circuit interrupting means connected in said system and means connected to be energized in accordance with a current and a voltage of the system for controlling the opening of said circuit interrupting means in dependence on the duration of the opposite rates of change of said current and voltage during asynchronous conditions of the system.

9. In combination, an electric system, means for subdividing said system when a voltage at one point of the system becomes asynchronous relatively to the corresponding voltage at another point of the system including circuit interrupting means connected in said system and rate of change responsive relay means connected to be energized in accordance with a current and a voltage of the system for controlling the opening of said circuit interrupting means in dependence on the duration of the opposite rates of change of said current and voltage during asynchronous conditions.

10. In combination, an electric system means for subdividing said system on the occurrence of a sustained asynchronous condition between a voltage at one point of the system and the corresponding voltage at another point of the system including circuit interrupting means connected in said system and means for controlling the opening of said circuit interrupting means in dependence on the duration of the opposite rates of change of a current and a voltage of the system during asynchronous conditions of the system including a rate of change relay means connected to be energized in accordance with said system current and a rate of change relay means connected to be energized in accordance with said system voltage.

11. In combination, an electric system means for subdividing said system on the occurrence of a sustained asynchronous condition between a voltage at one point of the system and the corresponding voltage at another point of the system including circuit interrupting means connected in said system and means for controlling the opening of said circuit interrupting means in dependence on the duration of the opposite rates of change of a current and a voltage of the system during asynchronous conditions of the system including a rate of change relay means connected to be energized in accordance with said system current and a rate of change relay means connected to be energized in accordance with said system voltage, and time action means controlled jointly by said rate of change relay means.

12. In combination, an electric system and means for determining a sustained asynchronous condition of the system when a voltage and a current of the system change oppositely for a predetermined time, including means connected to be energized in accordance with a current of the system, and means connected to be energized in accordance with a voltage of the system.

13. In combination, an electric system and means for determining a sustained asynchronous condition of the system when a voltage and a current of the system change oppositely for a predetermined time, including means connected to be energized in accordance with a current of the system, means connected to be energized in accordance with a voltage of the system, and time action means controlled jointly by said voltage and current energized means.

14. In combination, an electric system and means operative when a voltage and a current of the system change oppositely at greater than predetermined rates for a predetermined time, including means connected to be energized in accordance with a current of the system and a co-operating means connected to be energized in accordance with a voltage of the system.

15. In combination, an electric system and means for determining a sustained asynchronous condition of the system including means responsive to the existence of simultaneous opposite changes in a current and a voltage of the system for a predetermined time.

16. In combination, an electric system and means for determining a sustained asynchronous condition of the system including means responsive to the existence of simultaneous opposite changes in a current and a voltage of the system, and time action means controlled by said current and voltage responsive means.

VIKTOR AIGNER.